United States Patent [19]

Tuchiya et al.

[11] 4,351,561
[45] Sep. 28, 1982

[54] LOCKING DEVICE FOR AN OPENABLE AUTOMOBILE ROOF

[75] Inventors: Yoshimasa Tuchiya, Sayama; Katsumi Ishii, Tokyo; Toshiharu Iidaka, Funabashi; Masao Fujita, Yamatsurumachi, all of Japan

[73] Assignees: Nissan Motor Co., Ltd., Yokohamashi; Kokusan Kinzoku Kogyo Kabushiki Kaisha, Tokyo, both of Japan

[21] Appl. No.: 178,680

[22] Filed: Aug. 15, 1980

[30] Foreign Application Priority Data

Aug. 18, 1979 [JP] Japan .................... 54-104527

[51] Int. Cl.³ ............................................... B60J 7/18
[52] U.S. Cl. ...................................... 296/216; 16/259; 292/108; 292/341.17; 296/224
[58] Field of Search .............. 296/216, 217, 218, 224; 292/108, 304, 341.17; 16/146, 147, 141, 144, 166, 179

[56] References Cited

U.S. PATENT DOCUMENTS

| 2,381,633 | 8/1945 | Young | 292/341.17 |
| 3,059,271 | 10/1962 | Erickson | 292/304 |
| 3,815,389 | 6/1974 | Richards | 292/304 |
| 4,005,901 | 2/1977 | Lutke | 296/218 |

*Primary Examiner*—Joseph F. Peters, Jr.
*Assistant Examiner*—John A. Carroll
*Attorney, Agent, or Firm*—Balogh, Osann, Kramer, Dvorak, Genova & Traub

[57] ABSTRACT

A locking device for an openable automobile roof lid is provided. The base plate of the device is fixed to the edge of an opening formed in the roof panel. It is further formed with a hook portion at its one end. The lid to close the opening carries a handle at a portion corresponding to the hook portion of the base plate. To this handle, one end of a link is pivotally connected. From the other end of the link, a shaft pin projects and is rotatably fitted in the hook portion. To hold the shaft pin in the hook portion the base plate is provided with a stopper which is adapted to retract and release the shaft pin from the hook portion.

4 Claims, 20 Drawing Figures

FIG. 10
FIG. 9
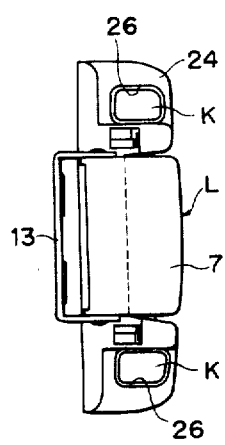
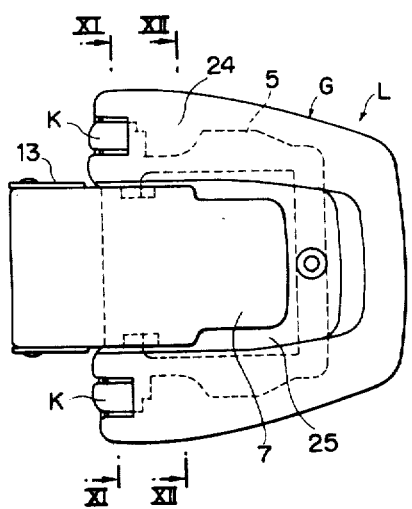
FIG. 11
FIG. 12
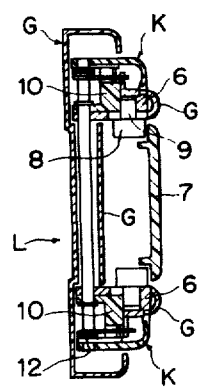
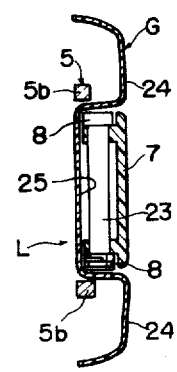

LOCKING DEVICE FOR AN OPENABLE AUTOMOBILE ROOF

BACKGROUND OF THE INVENTION

The present invention relates to a locking device for a detachable and openable automobile roof and, more particularly, to a locking device adapted for detachably and tiltably securing the rear edge of a lid to the corresponding edge of the opening formed in the roof panel.

An openable roof of an automobile has a roof panel 1 in which an opening 2 is formed as shown in FIG. 1. A lid 3 adapted to close the opening 2 is detachably secured at its front edge to the front edge of the opening 2 by means of a hinge device which is not shown. At the same time, the rear edge of the lid 3 is secured tiltably and detachably to the rear edge 4r of the opening. As the lid 3 is tilted, the cabin is communicated with the ambient air and is ventilated. The opening 2 can be fully opened as the lid 3 is detached from the edge of the opening.

For the openable roof of the type described, a locking device L as shown in FIGS. 2 and 3 is conventionally used.

More specifically, the locking device L has a base plate 5 fixed to the rear edge 4r of the roof opening, while a handle 7 is pivotally supported at its base end by the rear edge of a lid 3 through the medium of a bracket 13. The base plate 5 is connected at its front end to a substantially central portion of the handle 7 by means of a link 8 to form a toggle connecting mechanism. A pivot shaft 14 for pivotally connecting the base portion of the handle 7 is constituted by a pair of pivot pins 14a, 14b provided with knobs B,B. The pivot pins 14a, 14b are interconnected to each other by means of a spring 15. In operation, the lid 3 is locked in the closed state by the action of the above-mentioned toggle connection, and is locked in the opened state at the end of tilting motion of the lid 3. Also, at the stroke end of the tilting motion, the pair of pivot pins 14a, 14b are brought together and are withdrawn from the bearing 16 of the bracket 13, thereby to permit the rear edge of the lid 3 to be detached from the rear edge 4r of the roof opening.

In this conventional locking device L, however, the detaching of the lid 3 is made only through a troublesome work of tilting the rear edge of the lid 3, locking the lid 3 at the stroke end of the tilting motion in the opening position, urging side pins 17, 17 or knobs B,B toward each other by one hand while holding the rear edge of the lid 3 by the other hand, and withdrawing the pivot pins 14a, 14b from the bearing 16. In addition, in withdrawing the pivot pins 14a, 14b, it is necessary that substantially equal forces are applied to both pivot pins 14a, 14b, for otherwise one of the pivot pins will remain in the bearing 16.

SUMMARY OF THE INVENTION

Under these circumstances, the present invention aims at providing a locking device in which the detaching of the lid rear edge is made simply by moving the lid rear edge in the direction of movement in the tilting motion, without requiring removal of the pivot pins from the bearing, thereby to improve the handling of the locking device.

BRIEF DESCRIPTION OF THE DRAWINGS

The invention will be described in more detail hereinunder with reference to the accompanying drawings in which:

FIG. 9 is a plan view of the locking device in the state provided with a garnish;

FIG. 10 is a front elevational view of the locking device shown in FIG. 9;

FIG. 11 is a sectional view taken along the line XI—XI of FIG. 9;

FIG. 12 is a sectional view taken along the line XII—XII of FIG. 9;

DETAILED DESCRIPTION OF THE PREFERRED EMBODIMENT

Figure 1:
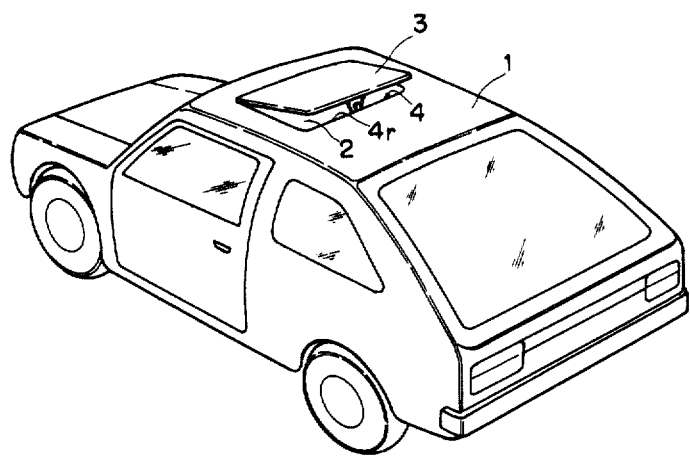
FIG. 1 is a perspective view of an automobile having an openable roof to which the locking device of the invention is applied.
Figure 2:
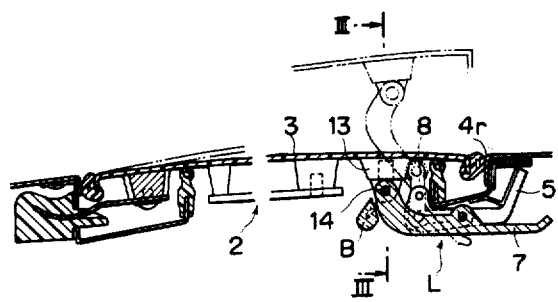
FIG. 2 is a sectional view of a conventional openable roof.
Figure 3:
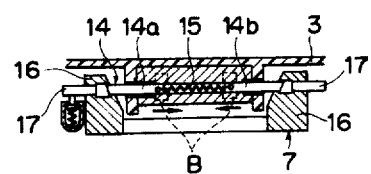
FIG. 3 is a sectional view taken along the line III—III of FIG. 2.
Figure 4:
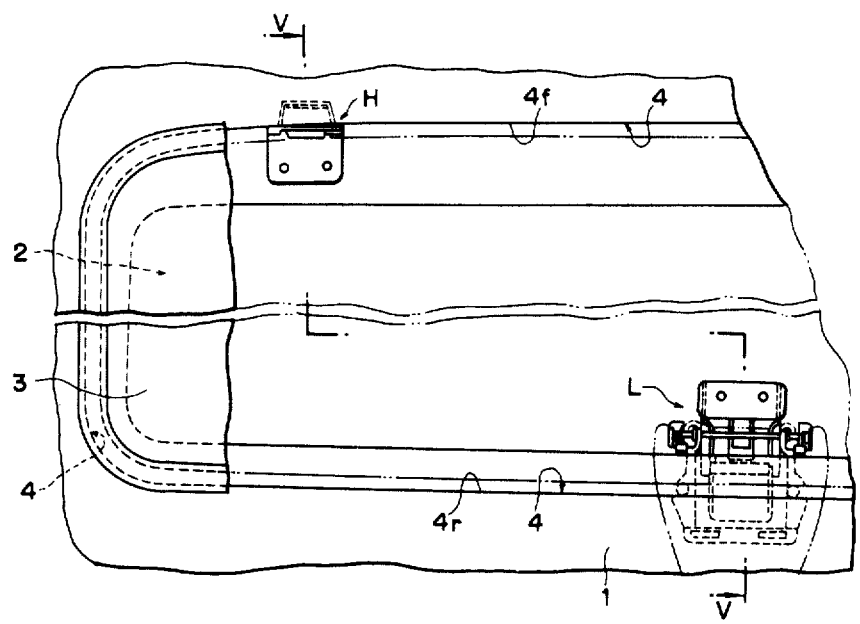
FIG. 4 is a partial plan view of the roof of an automobile having an openable roof incorporating the locking device of the invention.

Referring to FIG. 4, a lid 3 for opening and closing a roof opening 2 formed in a roof panel 1 is detachably secured to the edges 4 of the roof opening by means of a hinge device H and a locking device L. The locking device L, which secures the rear edge of the lid 3 to the rear edge 4r of the roof opening tiltably and detachably, has a base plate 5 of substantially U-shaped plane and fixed to a reinforcing member 19 forming a drip groove 18 and attached to a substantially central portion of the rear edge 4r of the roof opening, as will be seen from FIGS. 5 and 6. The locking device further has a handle 7 rotatably carried by a bracket 13 secured to the rear end of the lid 3 and a link 8 interconnecting the base plate 5 and the handle 7 in such a manner as to form a toggle connection.

As shown in FIGS. 5, 6 and 7a, 7b, the base plate 5 has a screw-receiving bore 20 formed in its base portion 5a, as well as in its arms 5b, and is fixed to the reinforcing member 19 by means of a screw (not shown) received by this bore 20. At the same time, each arm 5b of the base plate 5 has hook portion 6 at its front end. The hook portions 6 open obliquely upwardly in the direction of movement of the lid rear edge 3 in the tilting motion.

Figure 6:
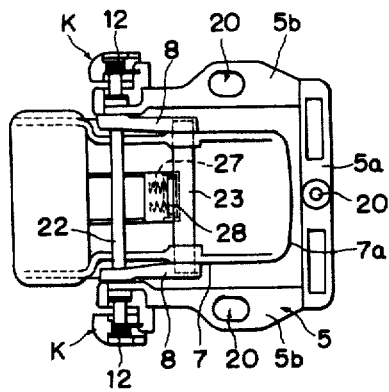
FIG. 6 is a plan view of the portion shown in FIG. 5 but a garnish is removed therefrom.

In addition, as will be seen from FIG. 6, when the lid 3 is locked in the closing position, the rotatable end 7a of the handle 7 extends in the region surrounded by the base portion 5a and the arms 5b of the base plate 5. A pair of links 8 disposed at both sides of substantially central portion of the handle 7 are connected by a connecting rod 23 and are rotatably supported by the substantially central portion of the handle 7. Shaft pins 9 are projected to the other ends of the pair of link 8 and are rotatably received by the hook portion 6 of respective arms of the base plate 5.

Figure 7A:
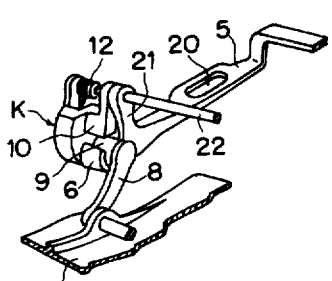
FIG. 7a is a partial perspective view of the locking device showing the state of connection between the hook portion of the base plate and the shaft pin of the link.
Figure 8A:
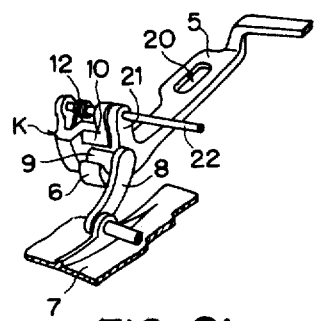
FIGS. 8a and 8b are partial perspective view and a partial sectional view corresponding to those of FIGS. 7a and 7b, respectively, showing the state in which the stopper is in the retracted position.
Figure 7B:
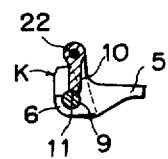
FIG. 7b is a partial sectional view of the locking device showing a stopper holding a shaft pin within a hook portion.
Figure 8B:
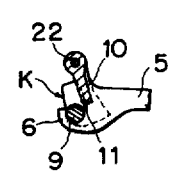
Figure 13:
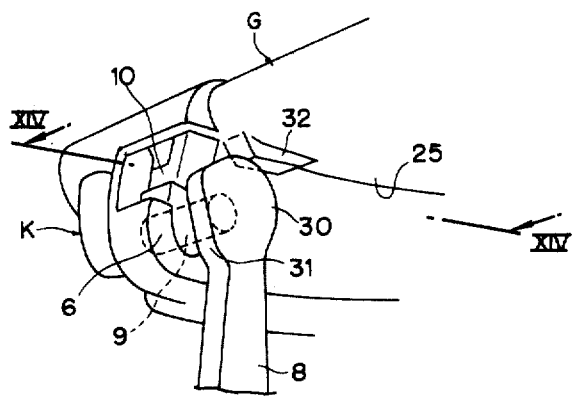
FIG. 13 is a partial perspective view showing the positional relationship between a projection formed on the garnish and links.

Referring now to FIGS. 8a, 8b, as well as to FIGS. 7a, 7b, the hook portions 6 formed at the front end of the base plate 5 are provided at their base portions with a pair of projections 21 which project in the same direction as the opening of the hook portions 6. A connecting rod 22 provided at its both ends with knobs K is rotatably supported between the projections 21 acting as bearings. These knobs K are provided with a stopper formed integrally therewith. The stopper 10 acts to prevent the shaft pins 9 of the link 8 received by the hook portions 6 from coming out of the latter.

Each stopper 10 is provided with a tapered abutting surface 11 and return springs 12 are attached to both ends of the connecting rod 22 within each knob K so as to bias the stoppers 10 such that the abutting surface 11 of the stopper closes the opening of each hook portion 6, i.e. into contact with the shaft pin 9, thereby to retain in the shaft pins 9 in the associated hook portions 6. Further, the stopper 10 is adapted to be retracted as either one of the knobs K of the handle 7 is pressed, to move the abutting surface 11 away from the shaft pin 9, so as to allow the latter from being relieved from the hook portion 6 through the opening of the latter, as will be understood from FIGS. 8a and 8b.

Figure 14:
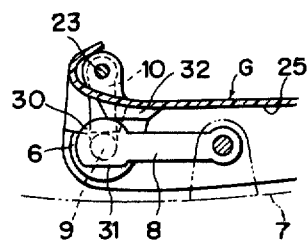
FIG. 14 is a sectional view taken along the line XIV—XIV of FIG. 13 showing the positional relationship between the links and projection in the locked state of the lid in closed position.
Figure 15:
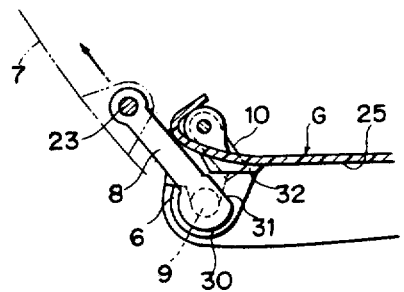
FIG. 15 is a sectional view taken along the line XV—XV of FIG. 13 showing the positional relationship between the links and projection in the state in which the locking device is in the stroke end of the tilting motion.

In the described embodiment, as will be seen from FIGS. 5 and 9 to 12, there is provided a garnish G adapted to cover the entire part of the obverse side of the base plate 5 when the locking device is fitted between the rear edge of the lid 3 and the rear edge 4r of the roof opening. This garnish G has an enlarged portion 24 spreading substantially in U-shaped form from both lateral sides and rear side thereof. The handle 7 and the pair of links 8 are positioned within the recess 25 surrounded by the enlarged portion 24. The shaft pin 9 of each link 8 extends through an opening formed in a vertical wall formed at the front side of each enlarged portion 24 and fits in the hook portion 6 located behind the front end of the enlarged portion 24. The knobs K disposed at both sides of front end of the base plate 5 are exposed through the openings 26 formed in the front ends of respective enlarged portions 24, so that the knobs K are operable from the outside of the garnish G. Furthermore, in the described embodiment, the link 8 having the pin 9 projected therefrom is provided at least one end thereof with a circular base portion 30 concentric with the shaft pin 9 and having a diameter greater than that of the shaft pin 9. The circular base portion 30 is provided with a notch 31 formed along a line tangent to the shaft pin 9. As will be seen from FIG. 14, when the lid is locked in the closed state, the notch 31 is positioned at the same side as the handle 7 so that, at the stroke end of the tilting motion, the notch 31 is directed toward the bottom of recess 25 of the garnish G as shown in FIG. 15. Furthermore, the garnish G is provided on the bottom of the recess 25 thereof with a projection 32 adapted to be contacted by the peripheral surface of the circular base portion 30 adapted to rotate together with the shaft pin 9 when the handle 7 is manipulated. The above-mentioned projection 32 contacts the peripheral surface of the base portion 30, until the handle 7 is rotated to bring the lid in the closed locked state nearly to the stroke end of the tilting motion, thereby to prevent the shaft pin 9 from being disengaged from the hook portion 6. At the same time, at the end of the tilting motion, the circular base portion 30 leaves the projection 32 because the latter is confronted by the notch 31 of the circular base portion 30, so that the shaft pin 9 is allowed to come out of the hook portion 6. The base portion 30 can have other shape than a circle, e.g. an oval form having no notch 31.

Figure 5:
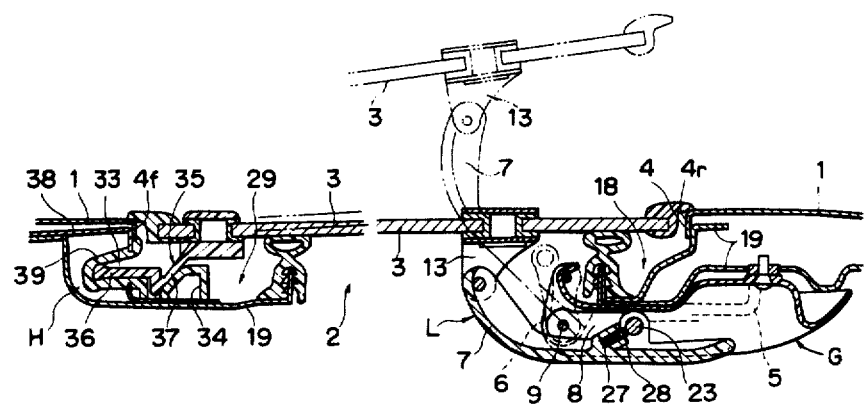
FIG. 5 is a sectional view taken along the line V—V of FIG. 4.

Further, as will be understood from FIG. 5, a checking device constituted by a spring 27 and a ball 28 is interposed between the connecting rod 23 and a bearing formed on the handle 7, so as to facilitate the confirmation of the locked state of the lid 3 in the closing position and the locked state of the same at the stroke end of the tilting motion, and to further ensure the state of locking.

Referring again to FIG. 5, there is shown a hinge device H for detachably securing the front edge of the lid 3 to the front edge 4f of the roof opening. This hinge device H has a housing panel 38 protruding from a reinforcing member 19 forming a drip groove 29 on the front edge 4f of the roof opening. A hinge housing 39 is fitted to an opening formed in the housing panel 38. The hinge housing 39 is provided with a linear passage 33 opened toward the rear side of the automobile. A guide portion 34 is formed to project from a portion in front of the entrance of the passage 33. On the other hand, a hinge tongue 35 projected from the front edge of the lid 3 has a fitting portion 36 adapted to detachably fit the passage 33 of the hinge housing 39, as well as a stopper portion 37 which is adapted to abut the guide portion 34 when the lid 3 is closed.

Figure 16:
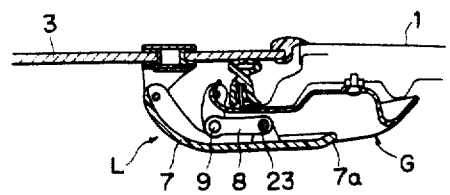
FIG. 16 is an illustration of the locking device shown in FIG. 5 in the state in which the lid is locked at the closing position.
Figure 17:
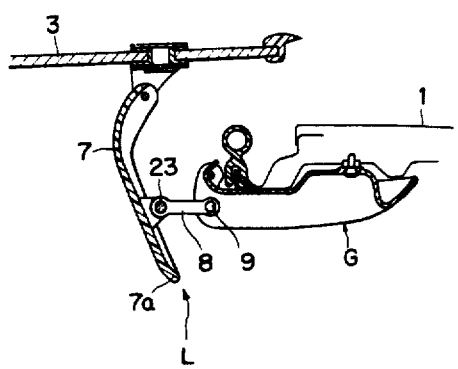
FIG. 17 is an illustration of the locking device shown in FIG. 15 making a tilting motion.
Figure 18:
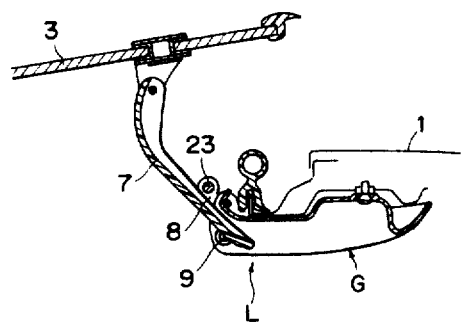
FIG. 18 is an illustration of the locking device in the state in which the lid is locked in the locked state at the stroke end of the tilting motion.

Thus, according to the locking device of the described embodiment, the lid 3 is locked in the closing position as shown in FIG. 16 by the action of the toggle connection. For making the rear end of the lid 3 tilt from this state, the rotatable end 7a of the handle 7 is rotated downward as shown in FIG. 17 to rotate the handle 7 around the axis of the shaft pin 9 received by the hook portion 6, as shown in FIG. 17, so as to form the locked state at the stroke end of the tilting operation by the toggle connection as shown in FIG. 18.

Furthermore, for fully opening the roof opening 2 by detaching the lid 3 from the edge 4 of the roof opening, the manipulation knob K is pressed at the stroke end of the tilting motion of the rear edge of the lid 3 as shown in FIGS. 8a and 8b, thereby to retract the stopper 10 integral with the knob K to relieve the shaft pin 9 of the link 8 from the hook portion 6. Then, as the tilting motion is continued further, the shaft pin 9 is disengaged from the hook portion 6 so that the connection between the lid rear edge and the rear edge 4r, which has been maintained by the locking device L, is dismissed and, subsequently, the hinge device H at the front edge of the lid 3 is dismissed. In this state, the lid 3 can be demounted from the roof opening 4 without any resistance.

To the contrary, for closing the roof opening 2 by attaching the lid 3 to the edge 4 of the roof opening, the hinge device H is brought into operation to retain the front edge of the lid 3 to the front edge 4f of the roof opening 4f, and the shaft pins 9 of the links 8 carried by the handle 7 are fitted into the hook portions 6 of the base plate 5 while retracting the stopper 10. As the stopper is freed, they are projected by the force of the return springs 12 so as to hold the shaft pins 9 within respective hook portions 6. Then, the rear edge of the lid 3 is closed by the procedure reverse to that of the tilting motion thereby to lock the lid 3 by the action of the toggle connection as shown in FIG. 16.

As has been described, according to the invention, there is provided a locking device for openable roof of automobile comprising a base plate attached to the rear edge of the roof opening, hook portions provided at front portion of the base plate, a handle attached to the rear part of a lid for closing the roof opening, links carried at their one ends by the handle and having shaft pins projecting from the other ends thereof and detachably received by the hook portions to form a toggle connection, and a stopper for preventing the shaft pins from coming out of the hook portions.

Therefore, the shaft pins are allowed to be disengaged from the hook portions simply by retracting the stoppers at the stroke end of the tilting motion of the lid rear end to facilitate the detaching of the lid from the roof. In addition, only a pressing operation for retracting the stoppers is required for holding the shaft pins in the hook portions. In addition, since this pressing is made in the direction opposite to the direction of rotation of the handle, it is possible to manipulate both of the handle and the stopper such that the stopper is pressed by thumb while the other fingers rotating the handle to detach the rear edge of the lid, so that the operation for detaching the lid is facilitated considerably.

Furthermore, in the described embodiment, the abutting surface of the stopper is tapered and is made to normally abut the shaft pins in the hook portions so that the jolt or play of the shaft pins is completely eliminated. It is also to be noted that, since the knob for operating the stopper is disposed at each side of the handle and operatively connected to each other, it is possible to retract the stopper by manipulating either one of the manipulation knobs. This means that the detaching of the lid can be made easily by a single hand from either one of the left and right seats, provided that the locking device is situated substantially at the breadthwise center of the automobile.

What is claimed is:

1. A locking device for an openable automobile roof panel comprising:
    a base plate fixed to the edge of an opening formed in the roof panel;
    a pair of hook portions provided at one end of said base plate;
    a lid adapted to close the opening in the roof panel and cooperate with said hook portions of the base plate;
    a handle pivotally supported by the edge of said lid corresponding to said hook portions;
    a pair of links pivotally connected at one end thereof to said handle;
    a shaft pin projected from the other end of each link and rotatably fitted in each hook portion to form a toggle connection;
    a pair of stoppers retractably carried by said base plate, each of said stoppers adapted to resiliently block one of said hook portions and hold a respective one of said shaft pins therein; and
    knobs disposed on both sides of said handle and interconnected to each other and adapted to operate said stoppers to retract by manipulation of either one of said knobs.

2. A locking device as claimed in claim 1, wherein each of said stoppers has a tapered abutting surface for abutment with a respective one of said shaft pins and is biased by a return spring into contact with said respective shaft pin thereby to prevent jolting or playing of said respective shaft pin in said hook portion.

3. A locking device as claimed in claim 1, wherein said other end of each link has a circular base portion to contact the base plate for preventing each of said shaft pins from being disengaged from the respective hook portion when the lid is in a position to close the opening formed in the roof panel.

4. A locking device as claimed in claim 3, wherein said circular base portion has a notch adapted to face the base plate at the end of a tilting motion of the edge of the lid such that each of said shaft pins is easily released from the respective hook portion.

* * * * *